United States Patent
Barson et al.

(10) Patent No.: US 11,016,189 B2
(45) Date of Patent: May 25, 2021

(54) SYSTEMS AND METHODS FOR SECURITY SYSTEM DEVICE TAMPER DETECTION

(71) Applicant: Honeywell International Inc., Morris Plains, NJ (US)

(72) Inventors: Michael Barson, Nuneaton (GB); Scott Robert Lang, Geneva, IL (US); Robin Janssen, Duesseldorf (DE)

(73) Assignee: Honeywell International Inc., Charlotte, NC (US)

(*) Notice: Subject to any disclaimer, the term of this patent is extended or adjusted under 35 U.S.C. 154(b) by 37 days.

(21) Appl. No.: 16/190,559

(22) Filed: Nov. 14, 2018

(65) Prior Publication Data

US 2020/0150264 A1   May 14, 2020

(51) Int. Cl.
*G01S 13/88*   (2006.01)
*G08B 29/04*   (2006.01)
*G01S 17/36*   (2006.01)

(52) U.S. Cl.
CPC .......... *G01S 13/886* (2013.01); *G01S 17/36* (2013.01); *G08B 29/046* (2013.01)

(58) Field of Classification Search
CPC .......... G08B 13/2491; G08B 13/2494; G08B 13/2497; G08B 13/184; G08B 13/187; G08B 13/126; G08B 13/181; G08B 13/183; G08B 13/24; G08B 13/26; G08B 29/183
USPC ........................................ 340/552
See application file for complete search history.

(56) References Cited

U.S. PATENT DOCUMENTS

| | | | |
|---|---|---|---|
| 7,411,921 B2* | 8/2008 | Strong | G01S 5/02 340/10.1 |
| 7,796,036 B2 | 9/2010 | Dalzell et al. | |
| 8,026,814 B1* | 9/2011 | Heinze | G06Q 10/06 340/572.1 |
| 8,373,581 B2* | 2/2013 | Hassan | G01C 17/38 340/426.18 |
| 9,189,933 B1* | 11/2015 | Stevens | G08B 13/08 |
| 9,240,111 B2* | 1/2016 | Scott | G05B 15/02 |
| 9,324,222 B2 | 4/2016 | Buckley et al. | |
| 9,576,449 B2 | 2/2017 | Smith | |
| 9,680,567 B2* | 6/2017 | Swanson | H04L 43/0852 |
| 9,763,097 B2* | 9/2017 | Robinson | H04W 12/08 |

(Continued)

FOREIGN PATENT DOCUMENTS

CN   206003257 U   3/2017

OTHER PUBLICATIONS

English language translation of bibliographic data and abstract of CN2006003257 (U).

(Continued)

*Primary Examiner* — Omeed Alizada
(74) *Attorney, Agent, or Firm* — Brooks, Cameron & Huebsch, PLLC

(57) ABSTRACT

Systems and methods for detecting tampering with a security device are provided. Some systems can include detecting an object within a detection range of one or more sensors of the security device, analyzing position data from the one or more sensors, wherein the position data is indicative of a position of the object relative to the security device, determining whether the positon data indicates that the object is approaching a security device, and when the position data indicates that the object is approaching the security device, issuing a warning signal.

17 Claims, 3 Drawing Sheets

(56) References Cited

U.S. PATENT DOCUMENTS

| | | | | |
|---|---|---|---|---|
| 9,978,233 | B2* | 5/2018 | Kariniemi | G08B 13/183 |
| 2011/0169625 | A1* | 7/2011 | James | B60Q 9/008 |
| | | | | 340/439 |
| 2011/0298579 | A1* | 12/2011 | Hardegger | F16P 3/14 |
| | | | | 340/3.1 |
| 2011/0308638 | A1 | 12/2011 | Hyland et al. | |
| 2013/0321150 | A1 | 12/2013 | Koenig et al. | |
| 2015/0080021 | A1* | 3/2015 | Bietz | H04B 1/3877 |
| | | | | 455/456.1 |
| 2018/0252800 | A1* | 9/2018 | Morcom | G01S 17/42 |
| 2018/0357870 | A1* | 12/2018 | Siminoff | G08B 13/19671 |
| 2019/0147655 | A1* | 5/2019 | Galera | G06F 3/011 |
| | | | | 345/419 |

OTHER PUBLICATIONS

English language translation of abstract, claims, and description of CN2006003257U.

Luis, et al., Low Power Wireless Smoke Alarm System in Home Fires, © 2015, https://www.ncbi.nlm.nih.gov/pmc/articles/PMC4570444/.

* cited by examiner

SYSTEMS AND METHODS FOR SECURITY SYSTEM DEVICE TAMPER DETECTION

FIELD

The present invention relates generally to security system devices. More particularly, the present invention relates to security system devices that detect malicious tampering.

BACKGROUND

Security systems are known to detect threats within a secured area, and such threats include events that represent a risk to human safety or a risk to assets.

Security systems typically include one or more security sensors that detect the threats within the secured area. For example, smoke, motion, and/or intrusion sensors can be distributed throughout the secured area in order to detect the threats. Furthermore, security systems typically include notification appliances, such as sounders and strobe lights. Further still, security systems sometimes include manual activation stations (i.e. pull stations) that can be used by occupants of the secured area to indicate an emergency to the security systems.

All such security system devices can be subject to malicious tampering and masking after being installed within the secured area. For example, call points and pull stations can be activated intentionally, even when no emergency is present, such as during a prank at a school. In addition, smoke detectors can be covered or removed from an installation location.

As such, there is a need for security system devices that effectively detect tampering or unwanted activation.

DETAILED DESCRIPTION

Figure 1:
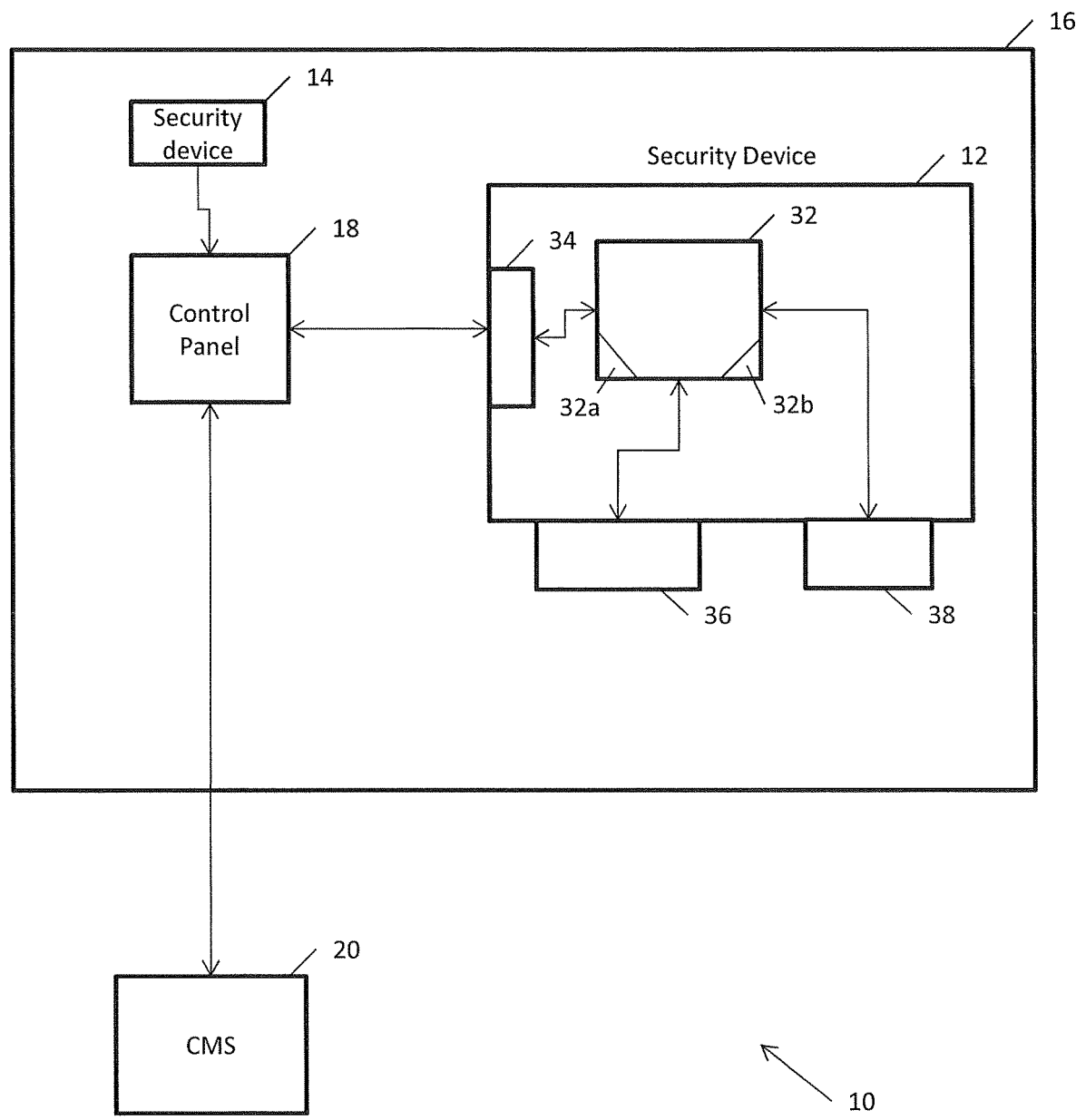
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for detecting an attempt to tamper with a security device. Tampering can occur in any of a number of different ways and can depend on a type of the security device (glass break, smoke, pull station, etc.). For example, tampering with a call point or a pull station can occur when an unauthorized user activates the call point or the pull station when no emergency or threat actually exists. As another example, tampering with a smoke detector can occur when the unauthorized user places a bag or a dust cover over the smoke detector so that the smoke detector is unable to measure ambient conditions outside of the bag or the dust cover.

Embodiments disclosed herein can include systems and methods that detect the attempt to tamper by detecting an object in close proximity (e.g. 30 cm or less) of the security device and a position or a location of the object relative to the security device. In this regard, the security device can include one or more sensors and a microcontroller that can measure object movement or gestures based on data received from the one or more sensors. In some embodiments, the microcontroller and the one or more sensors can differentiate malicious tampering from harmless nearby movement, and in some embodiments, the one or more sensors can include time-of-flight (ToF) sensors.

In some embodiments, the security device can include two ToF sensors mounted at different locations on an external surface of a housing of the security device, and each of the two ToF sensors can send ToF data to the microcontroller, which can use the ToF data from the two ToF sensors to recognize the object movement or gestures detected by one or both of the two ToF sensors. For example, using ToF principles known in the art, the microcontroller can determine whether the ToF data from both of the ToF sensors indicates that the object is approaching the security device. Then, the microcontroller can confirm that the object is moving toward the security device by determining whether both of the two ToF sensors detect the object and the ToF data from both of the two ToF sensors is indicative of matching changes in the position of the object relative to the security device. For example, if a first of the two ToF sensors detects a change in the position of the object before a second of the two ToF sensors detects the change in the position of the object, then the microcontroller can determine that the object is merely passing by the security device and not dangerously approaching the security device.

In accordance with the above, the security device can differentiate between the object harmlessly moving past the security device and the object maliciously moving toward the security device. When the security device detects the object maliciously moving toward the security device, the security device can issue, transmit, or emit a warning signal (e.g. activate a sounder, an audible siren, a strobe light, or a warning light) or can report the tampering to a control panel.

In some embodiments, the control panel can disregard a report of the tampering from the security device when an authorized user enters or has previously entered a code or a command into the control panel notifying the control panel that maintenance of the security device (e.g. replacing batteries) is being or is to be performed. In this example, a maintenance person or a homeowner could enter the code or the command into the control panel before performing the maintenance on the security device. Because the object (e.g. the maintenance person's hand or a screwdriver) must approach the security device to perform the maintenance, the security device could identify the maintenance as the attempt to tamper and, responsive thereto, transmit the report of the tampering. However, because the control panel received the code or the command, the control panel can disregard or ignore the report of the tampering, and the maintenance person can perform the maintenance without causing the security device or the control panel to issue, transmit, or emit a tampering alarm. For example, when the security device would otherwise issue, transmit, or emit the warning signal upon detecting tampering, the code or the command entered into the control panel can cause the control panel to send a signal to the security device that disables the warning signal or the ToF sensors for a predetermined period of time or until the code or command is reentered into the control panel. Upon completion of the maintenance, the code or the command can be reentered into the control panel to indicate that the maintenance is complete, thereby causing the security device to once again issue, transmit, or emit the warning signal or the report of the tampering responsive to detecting the tampering.

FIG. 1 is a block diagram of a security system 10 in accordance with disclosed embodiments. As seen in FIG. 1, the security system 10 can include one or more security devices 12, 14. In some embodiments, some of the security devices 12, 14 can monitor a secured area 16 for threats and include intrusion, camera, motion, fire, glass break, smoke, and gas detectors. Additionally or alternatively, in some embodiments, some of the security devices 12, 14 can include manual call points, activation nodes, pull stations, or other manually-activated devices that can be used by occupants of the secured area 16 to signal the threats. In any embodiment, the security devices 12, 14 can communicate with a control panel 18, and the control panel 18 can monitor for activation of the security devices 12, 14.

In some embodiments, the control panel 18 may send an alarm message to a central monitoring station 20 upon the activation of one of the security devices 12, 14. The central monitoring station 20 may respond by summoning appropriate help. For example, if the one of the security devices 12, 14 detects a fire, then the central monitoring station 20 may summon a local fire department. Alternatively, if the one of the security devices 12, 14 detects an intrusion, then the central monitoring station 20 may summon the police.

The security device 12 (and the security device 14) can include control circuitry 32, which can include one or more programmable processors 32a and executable control software 32b as would be understood by one of ordinary skill in the art. The executable control software 32b can be stored on a transitory or non-transitory computer readable medium, including, but not limited to local computer memory, RAM, optical storage media, magnetic storage media, and the like. In some embodiments, the control circuitry 32, the one or more programmable processors 32a, and the executable control software 32b can execute and control some of the methods disclosed herein.

The security device 12 can also include a transceiver 34, a first ToF sensor 36, and a ToF sensor 38. In some embodiments, the security device 12 can communicate with the control panel 18 via the transceiver 34, and in some embodiments, the security device 12 can communicate with the control panel 18 wirelessly.

In some embodiments, the first ToF sensor 36 and the second ToF sensor 38 can be mounted in different locations on an external surface of a housing of the security device 12. The first ToF sensor 36 can detect whether an object is positioned within a detection range of the first ToF sensor 36 (e.g. 30 cm or less), and the second ToF sensor 38 can detect whether the object is positioned within the detection range of the second ToF sensor 38.

When the first ToF sensor 36 fails to detect the object within the detection range thereof, the first ToF sensor 36 can send an "out-of-range" signal to the control circuitry 32. Similarly, when the second ToF sensor 38 fails to detect the object within the detection range thereof, the second ToF sensor 38 can send the "out-of-range" signal to the control circuitry 32. When the control circuitry 32 receives the "out-of-range" signal from the first ToF sensor 36, the control circuitry 32 can determine that that no object has been detected by the first ToF sensor 36. Similarly, when the control circuitry 32 receives the "out-of-range" signal from the second ToF sensor 36, the control circuitry 32 can determine that no object has been detected by the second ToF sensor 38.

However, when either of the first ToF sensor 36 or the second ToF sensor 38 detects the object, that one of the first ToF sensor 36 or the second ToF sensor 38 can indicate to the control circuitry 32 that the object is present. For example, the first ToF sensor 36 or the second ToF sensor 38 can indicate that the object is present by transmitting ToF data to the control circuitry 32, which can use the ToF data to identify a position of the object relative to the security device 12.

In response to receiving the ToF data or other data indicative of the object being present from the first ToF sensor 36 or the second ToF sensor 38, the control circuitry 32 can execute the executable control software 32b to determine whether the position of the object relative to the security device 12 indicates movement or a gesture that is indicative of an attempt to tamper. For example, the control circuitry 32 can identify the attempt to tamper when the ToF data from the first ToF sensor 36 and the second ToF sensor 38 is indicative of matching changes in the position of the object (e.g. the object is approaching). Alternatively, the control circuitry 32 can determine that the object is merely passing by the security device when the ToF data from either of the first ToF sensor 36 or the second ToF sensor 38 indicates that that the object is not approaching the security device 12.

Although, for illustration purposes, FIG. 1 shows only the security device 12 as having the control circuitry 32, the one or more programmable processors 32a, the executable control software 32b, the transceiver 34, the first ToF sensor 36, and the second ToF sensor 38, it is to be understood that the security device 14 may be similarly configured.

Figure 2:
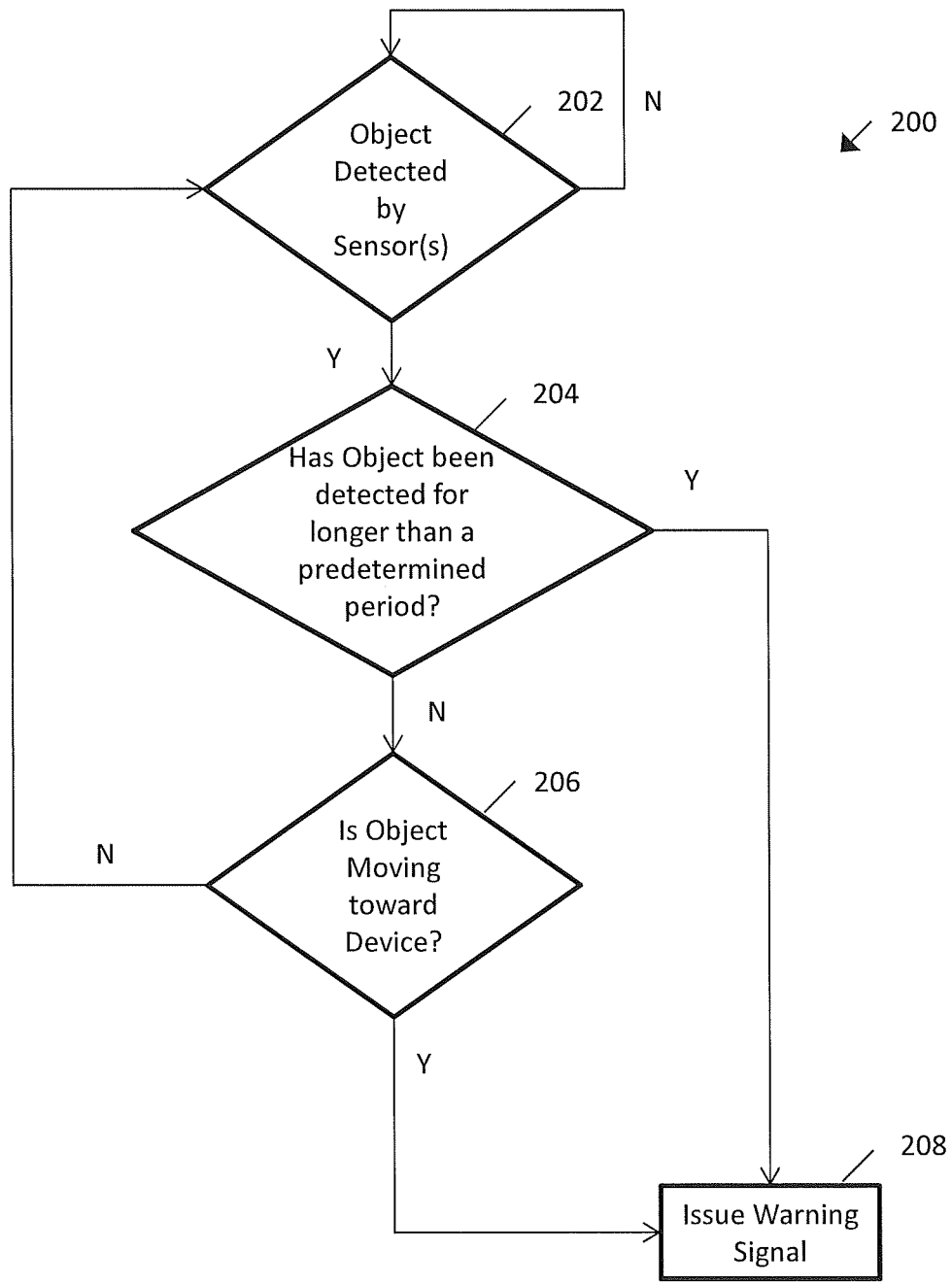
FIG. 2 is a flow diagram of a method in accordance with disclosed embodiments.

FIG. 2 is a flow diagram of a method 200 for detecting an attempt to tamper with a security device (e.g. the security device 12) in accordance with disclosed embodiments. As seen in FIG. 2, the method 200 can include a processor (e.g. the programmable processor 32a) of the security device determining whether an object has been detected by one or more sensors as in 202. For example, the one or more sensors can include two ToF sensors (e.g. the first ToF sensor 36 and the second ToF sensor 38) that send ToF data to the processor. The method 200 can include the processor continuing to determine whether the object has been detected by the one or more sensors as in 202 until the object has been detected. However, responsive to detecting the object, the method 200 can include the processor processing and analyzing a plurality of ToF data readings captured at a plurality of points in time from the one or more sensors to determine whether the object has been detected by the one or more sensors for longer than a predetermined period of time as in 204. For example, when the plurality of ToF data readings from the one or more sensors are indicative of the object being detected for longer than the predetermined period of time, the processor can determine that the object is lingering near the security device or that a tampering device (e.g. a dust pan or a bag) has been placed over the security device (e.g. when the security device is a smoke detector). Similarly, when the plurality of ToF data readings from the one or more sensors are indicative of the object being detected for longer than the predetermined period of time, the processor can determine that the security device (e.g. a glass break sensor when the security device is a glass break detector) has been masked by a physical barrier or a spray.

When the processor determines that the object has been detected by the one or more sensors for longer than the predetermined period of time as in 204, the method 200 can include the processor determining whether the object is moving toward the security device as in 206. In this regard, the processor may process, analyze, and compare the plurality of ToF data readings from a first of the one or more sensors and the plurality of ToF data readings from a second of the one or more sensors to determine whether both of the first of the one or more sensors and the second of the one or more sensors indicate that the object is approaching the security device. For example, when the plurality of ToF data readings from one of the one or more sensors is indicative of a change in movement of the object more than a set period of time before the plurality of ToF data readings from another of the one or more sensors is indicative of the change in movement of the object, the processor may determine that the object is simply passing by the security device, not moving toward the security device.

When the processor determines that the object is either moving toward the security device as in 206 or has been detected for longer than the predetermined period of time as in 204, the method 200 can include the processor issuing, transmitting, or emitting a warning signal as in 208. In some embodiments, the warning signal can include an audible or visual signal to deter tampering. Additionally or alternatively, in some embodiments, the warning signal can include a notification signal to a control panel (e.g. the control panel 18) indicating that the security device has detected the attempt to tamper.

Figure 3:
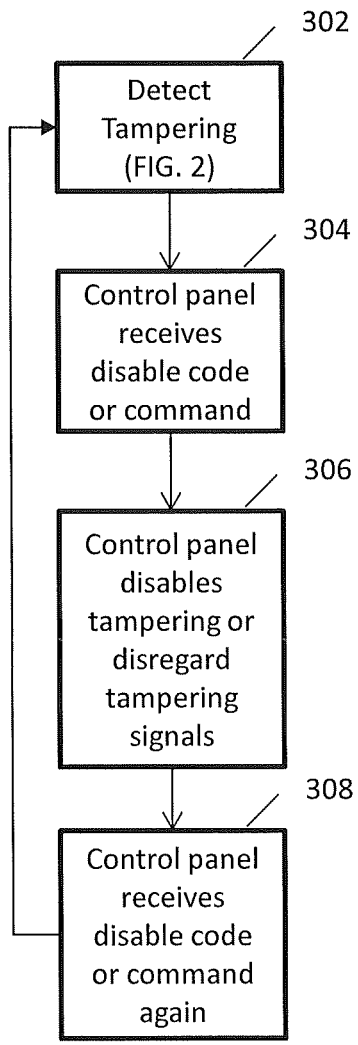
FIG. 3 is a flow diagram of a method in accordance with disclosed embodiments.

FIG. 3 is a flow diagram of a method 300 for disabling or disregarding tampering detection by a security device (e.g. the security device 12) in accordance with disclosed embodiments. As seen in FIG. 3, the method 300 can include a processor (e.g. the programmable processor 32a) of the security device executing a tampering detection method, such as the method 200, as in 302, and a control panel (the control panel 18) or a mobile device that executes an application and communicates with a security system that includes the security device receiving a code or a command as in 304. The code or the command can be entered into the control panel through a user interface of the control panel or the mobile device, and the code or the command can indicate that maintenance is being or will be performed on the security device and that the tampering detection should be suspended temporarily. Then, the method 300 can include the control panel or the mobile device transmitting an instruction signal to the security device instructing the security device to disable the tampering detection (e.g. by disabling tampering sensors or by disabling an audible or visual device) or the control panel disregarding or ignoring any warning or notification signals received from the security device as in 304. The method 300 can include the control panel continuing to disregard the warning or notification signals indicating tampering until the control panel or the mobile device receives the code or the command again as in 308. Responsive thereto, the method 300 can include the control panel or the mobile device instructing the security device to reactivate the tamper detection as in 302 or refrain from disregarding and ignoring the warning and notification signals from the security device.

The systems and methods disclosed herein improve on known systems and methods of tampering detection at least because the systems and methods disclosed herein can differentiate between attempts to tamper and objects harmlessly passing by a security device.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
    detecting an object within a detection range of a plurality of sensors of a security device;
    determining movement of the object or a gesture by the object that indicates tampering with the security device is occurring by determining whether both first data from a first sensor of the plurality of sensors and second data from a second sensor of the plurality of sensors are indicative of matching changes in the position of the object relative to the security device, wherein determining whether both first data from the first sensor and second data from the second sensor are indicative of matching changes in the position of the object relative to the security device comprises determining whether the first sensor detected a change in the position of the object more than a predetermined period of time before the second sensor detected the change in the position of the object; and
    when the determined movement of the object or a gesture by the object indicates tampering with the security device is occurring, issuing a warning signal.

2. The method of claim 1 wherein the first sensor and the second sensor are both time-of-flight (ToF) sensors.

3. The method of claim 1 wherein the plurality of sensors are mounted on different locations of an external surface of the security device.

4. The method of claim 1 further comprising determining whether the object has been detected within the detection range of the plurality of sensors for longer than another predetermined period of time.

5. The method of claim 1 wherein issuing the warning signal comprises activating an audible or visual alarm device.

6. The method of claim 1 wherein issuing the warning signal comprises transmitting a tampering alarm signal to a control panel in communication with the security device.

7. The method of claim 6 further comprising:
    receiving a tampering detection disable signal from the control panel; and
    responsive to receiving the tampering detection disable signal, refraining from attempting to detect the object within the detection range of the one or more sensors until a tampering detection enable signal is received from the control panel, refraining from analyzing the position data from any of the plurality of sensors until the tampering detection enable signal is received from the control panel, or refraining from issuing the warning signal when the position data indicates that the object is approaching the security device until the tampering detection enable signal is received from the control panel.

8. A security device comprising:
    a plurality of time-of-flight (ToF) sensors;
    a programmable processor; and
    executable control software stored on a non-transitory computer readable medium, wherein the plurality of ToF sensors detect whether an object is within a detection range of the plurality of ToF sensors, wherein the programmable processor and the executable control software analyze data from the plurality of ToF sensors to determine movement of the object or a gesture by the object that indicates tampering with the security device is occurring by determining whether both first data from a first ToF sensor of the plurality of ToF sensors and second data from a second ToF sensor of the plurality of ToF sensors are indicative of matching changes in the position of the object relative to the security device, wherein determining whether both first data from the first ToF sensor and second data from the second ToF sensor are indicative of matching changes in the position of the object relative to the security device comprises determining whether the first ToF sensor detected a change in the position of the object more than a predetermined period of time before the second ToF sensor detected the change in the position of the object, and wherein, when the data from the plurality of ToF sensors determines movement of the object or a gesture by the object that indicates tampering with the security device is occurring, the programmable processor and the executable control software issue a warning signal.

9. The security device of claim 8 wherein the programmable processor and the executable control software compare first data from the first ToF sensor and second data from the second ToF sensor.

10. The security device of claim 8 further comprising:
a housing,
wherein the plurality of ToF sensors are mounted on different locations of an external surface of the housing.

11. The security device of claim 8 wherein the programmable processor and the executable control software determine whether the object has been detected within the detection range of the one or more ToF sensors for longer than another predetermined period of time.

12. The security device of claim 8 further comprising:
an audible siren,
wherein the programmable processor and the executable control software issue the warning signal by activating the audible siren.

13. The security device of claim 8 further comprising:
a strobe light,
wherein the programmable processor and the executable control software issue the warning signal by activating the strobe light.

14. The security device of claim 8 further comprising:
a transceiver,
wherein the programmable processor and the executable control software issue the warning signal by transmitting, via the transceiver, a tampering alarm signal to a control panel in communication with the transceiver.

15. The security device of claim 14 wherein the programmable processor and the executable control software receive a tampering detection disable signal from the control panel, and wherein, responsive to receiving the tampering detection disable signal, the plurality of ToF sensors refrain from attempting to detect the object within the detection range of the plurality of ToF sensors until a tampering detection enable signal is received from the control panel, the programmable processor and the executable control software refrain from analyzing the position data from any of the plurality of ToF sensors until the tampering detection enable signal is received from the control panel, or the programmable processor and the executable control software refrain from issuing the warning signal when the position data indicates that the object is approaching the security device until the tampering detection enable signal is received from the control panel.

16. A method comprising:
a control panel receiving a code or a command;
a security device determining that movement of an object or a gesture by the object indicates tampering with the security device is occurring by determining whether both first data from a first time-of-flight (ToF) sensor of a plurality of time-of-flight (ToF) sensors and second data from a second ToF sensor of the plurality of ToF sensors are indicative of matching changes in the position of the object relative to the security device, wherein determining whether both first data from the first ToF sensor and second data from the second ToF sensor are indicative of matching changes in the position of the object relative to the security device comprises determining whether the first ToF sensor detected a change in the position of the object more than a predetermined period of time before the second ToF sensor detected a change in the position of the object;
the control panel receiving a tampering alarm signal from a security device indicative that the security device has determined from data from a plurality of time-of-flight (ToF) sensors of the security device that movement of an object or a gesture by the object indicates tampering with the security device is occurring; and
the control panel disregarding or ignoring the tampering alarm signal until the control panel receives the code or the command again.

17. The security device of claim 4, wherein when the programmable processor and the executable control software have determined that the object has been detected within the detection range of the plurality of ToF sensors for longer than the predetermined period of time, the programmable processor and the executable control software determine whether the security device has been masked by a physical barrier or a spray.

* * * * *